United States Patent
Watanabe et al.

(10) Patent No.: US 10,218,443 B2
(45) Date of Patent: Feb. 26, 2019

(54) REDUCED FIBER COUNT NETWORKS, DEVICES, AND RELATED METHODS

(71) Applicants: Sumitomo Electric Lightwave Corp., Research Triangle Park, NC (US); Sumitomo Electric Industries, LTD, Osaka (JP)

(72) Inventors: Tsutomu Watanabe, Morrisville, NC (US); William Dmytro Charuk, Apex, NC (US); Jamie Joshue Seawell, Fuquay Varina, NC (US); Yukihiro Yokomachi, Yokosuka (JP)

(73) Assignees: Sumitomo Electric Lightwave Corp., Raleigh, NC (US); Sumitomo Electric Industries, Ltd., Osaka (JP)

( * ) Notice: Subject to any disclaimer, the term of this patent is extended or adjusted under 35 U.S.C. 154(b) by 464 days.

(21) Appl. No.: 14/310,280

(22) Filed: Jun. 20, 2014

(65) Prior Publication Data

US 2015/0326316 A1 Nov. 12, 2015

Related U.S. Application Data

(60) Provisional application No. 61/991,077, filed on May 9, 2014.

(51) Int. Cl.
*H04B 10/12* (2006.01)
*H04B 10/27* (2013.01)
(Continued)

(52) U.S. Cl.
CPC .......... *H04B 10/27* (2013.01); *G02B 6/3897* (2013.01); *G02B 6/4452* (2013.01);
(Continued)

(58) Field of Classification Search
CPC .... H04B 10/27; H04B 10/2504; H04B 10/40; G02B 6/3897; G02B 6/4452;
(Continued)

(56) References Cited

U.S. PATENT DOCUMENTS 5,568,576 A * 10/1996 Takai ................. H04B 10/2503
385/17
6,758,600 B2 7/2004 Del Grosso et al.
(Continued)

OTHER PUBLICATIONS

Non-Final Office Action for Application No. 14957872 dated Aug. 12, 2016.
(Continued)

*Primary Examiner* — M. R. Sedighian
(74) *Attorney, Agent, or Firm* — Jenkins, Wilson, Taylor & Hunt, P.A.

(57) ABSTRACT

Optical fiber networks, devices, and related methods are disclosed herein. In some aspects, an optical fiber network includes network devices having optical fibers for transmitting and receiving data. In the network, 100% of the optical fibers are utilized end-to-end across the plurality of network devices. Networks herein are also devoid of converters and include only a single direction connection between fibers at interconnect points between devices. Network devices may include ferrules, where at least some of the ferrules are devoid of an optical fiber. A method for providing an optical fiber network includes providing network devices having optical fibers for transmitting and receiving data and transmitting data using 100% of the optical fibers end-to-end across the network devices.

3 Claims, 8 Drawing Sheets

(51) Int. Cl.
  *H04B 10/25* (2013.01)
  *H04B 10/40* (2013.01)
  *G02B 6/38* (2006.01)
  *G02B 6/42* (2006.01)
  *G02B 6/44* (2006.01)

(52) U.S. Cl.
  CPC ......... *H04B 10/2504* (2013.01); *H04B 10/40* (2013.01); *G02B 6/3885* (2013.01); *G02B 6/4246* (2013.01); *G02B 6/4292* (2013.01); *G02B 6/4403* (2013.01); *G02B 6/4432* (2013.01)

(58) Field of Classification Search
  CPC .. G02B 6/3885; G02B 6/4246; G02B 6/4292; G02B 6/4403; G02B 6/4432
  USPC .......................... 398/140–145, 135–139, 58
  See application file for complete search history.

(56) References Cited

U.S. PATENT DOCUMENTS

| | | |
|---|---|---|
| 6,869,227 B2 | 3/2005 | Del Grosso et al. |
| 7,147,383 B2 | 12/2006 | Sullivan |
| 7,184,635 B2 | 2/2007 | Livingston |
| 7,237,966 B2 | 7/2007 | Quinby et al. |
| 7,416,347 B2 | 8/2008 | Livingston et al. |
| 7,689,079 B2 | 3/2010 | Burnham et al. |
| 7,756,371 B1 | 7/2010 | Burnham et al. |
| 8,009,959 B2 | 8/2011 | Barnes et al. |
| 8,251,591 B2 | 8/2012 | Barnes et al. |
| 8,485,737 B2 | 7/2013 | Kolesar |
| 8,622,631 B2 | 1/2014 | Kolesar |
| 8,636,424 B2 | 1/2014 | Kuffel et al. |
| 8,861,918 B2 | 10/2014 | Vazquez et al. |
| 8,873,967 B2 | 10/2014 | Barnes et al. |
| 9,020,309 B2 | 4/2015 | Kolesar |
| 9,057,863 B2 | 6/2015 | Rhoney et al. |
| 9,097,874 B2 | 8/2015 | Coleman et al. |
| 2003/0072535 A1 | 4/2003 | Sun |
| 2003/0072537 A1* | 4/2003 | Eichenberger ....... G02B 6/3807 385/89 |
| 2005/0084216 A1 | 4/2005 | Yang |
| 2005/0201691 A1 | 9/2005 | Mudd |
| 2005/0207709 A1 | 9/2005 | Del Grosso et al. |
| 2007/0036552 A1* | 2/2007 | Weaver .............. H04B 10/0779 398/136 |
| 2008/0101751 A1 | 5/2008 | Luther |
| 2009/0238577 A1* | 9/2009 | Tamanuki .............. G02B 6/423 398/141 |
| 2011/0103803 A1* | 5/2011 | Kolesar .................... G02B 6/28 398/142 |
| 2012/0189259 A1 | 7/2012 | Manes |
| 2012/0275753 A1* | 11/2012 | Reinhardt ........... G02B 6/4495 385/135 |
| 2012/0288233 A1 | 11/2012 | Barnes et al. |
| 2012/0301136 A1* | 11/2012 | Chang .................. H04B 7/0413 398/16 |
| 2013/0308915 A1 | 11/2013 | Buff et al. |
| 2014/0133810 A1 | 5/2014 | Schneider |
| 2014/0140660 A1 | 5/2014 | Buff et al. |
| 2015/0027967 A1 | 1/2015 | Vazquez et al. |
| 2015/0162982 A1* | 6/2015 | Buff ....................... H04B 10/25 398/142 |
| 2015/0286024 A1 | 10/2015 | Kolesar |
| 2015/0326316 A1 | 11/2015 | Watanabe |
| 2015/0331192 A1 | 11/2015 | Hall |
| 2017/0160495 A1 | 6/2017 | Ohtsuka |

OTHER PUBLICATIONS

Notice of Allowance for U.S. Appl. No. 14/957,872 dated Dec. 14, 2016.
Notice of Allowance for U.S. Appl. No. 14/957,872 dated Apr. 3, 2017.
Notice of Allowance for U.S. Appl. No. 14/957,872 dated Jun. 28, 2017.
Notice of Allowance for U.S. Appl. No. 14/957,872 dated Nov. 16, 2017.

* cited by examiner

US 10,218,443 B2

REDUCED FIBER COUNT NETWORKS, DEVICES, AND RELATED METHODS

CROSS REFERENCE TO RELATED APPLICATIONS

This application claims priority to U.S. Provisional Patent Application Ser. No. 61/991,077, filed on May 9, 2014, the disclosure of which is incorporated herein by reference in the entirety.

TECHNICAL FIELD

The present subject matter relates generally to optical fiber communication networks, devices, and/or methods and, more particularly, to data centers, devices, and/or related methods having a reduced optical fiber count or reduced fiber count basis.

BACKGROUND

Optical fibers are used in various types of communication networks, for example for facilitating data transfer at a rate of at least one gigabit per second (i.e., "Gbps" or "G"). Traditional 1G and 10G networks, in which data is transferred at a rate of 1 Gbps and 10 Gbps, respectively, are based upon a 12-count ("12ct") fiber and/or a structured cabling system (SCS) utilizing a 12ct fiber basis. That is, the base unit of network hardware including cables, ribbon cables, trunk cables, connectors, converters, adapters, patches, etc., of traditional networks is a 12ct fiber.

The demand for faster data transfer (e.g., at a rate of 40G, 100G, 400G, etc.) is ever increasing, in part due to the onset of smart technology, which utilize fiber networks and/or components thereof for accessing (i.e., sending/receiving) data from network carriers/providers, media outlets, the cloud, data applications, social media applications, etc. Network providers utilize data centers for housing network hardware or components, including servers, transceivers, receivers, communication modules, converters, connectors, plates, patches, racks, routers, switches, ports, etc., for supporting 1G/10G/40G/100G networks. To date, networks and network data centers utilize hardware based upon the traditional 12ct fiber as a fiber basis.

In faster networks, such as in 40G and 100G networks, only 8 of the 12 fibers may be used for facilitating data transmission. Thus, conventional networks have extensive amounts of unused (e.g., wasted) fibers. This is costly and expensive to manufacture, manage, and maintain. In addition, expensive converters or conversion modules must be used to convert, upgrade, and/or otherwise scale slower networks (i.e., 1G, 10G) into faster networks (i.e., 40G, 100G, etc.).

FIG. 1 illustrates a conventional multi-fiber push on (MPO) connector device, generally designated MPO, utilized in conventional fiber networks. MPO connector includes a 12ct basis. As noted above, in 40G and 100G networks, only 8 of the 12 fibers may be used for facilitating data transmission (e.g., 4×TX and 4×RX). The middle four fibers, generally designated $F_M$, are present in the middle ferrule positions of MPO, but are unused and may be referred to as "dark". The outer fibers generally designated $F_O$ are disposed on outermost positions of MPO and are used for transmission/receipt of data in a communication network. In traditional networks using traditional practices of 12ct SCS, the middle four fibers $F_M$ result in a fiber waste of about 33%, as roughly about ⅓ of the fibers are unused. This is wasteful, expensive, and inefficient, especially for networks utilizing optical multi-mode (OM) fibers as described by ISO 11801 and/or as defined in TIA-492-AAAD. The 33% fiber waste amounts to a considerable waste in terms of dollars, materials, resources, and space, which is unacceptable, especially in large networks utilizing data centers having hundreds of ports.

In addition to fiber waste, another problem encountered in conventional networks and data centers utilizing a 12ct fiber basis is that conversion modules are required to achieve 100% fiber utilization. Many network carriers simply cannot absorb a 33% fiber waste. FIG. 2 illustrates a converter, or conversion module generally designated M.

Conversion module M is configured to receive incoming fibers and re-configure or map the fibers in such a way that all fibers become utilized at the output. For example, module M includes two input MPO connections or ports $M_I$, each consisting of a 12ct fiber basis, for a total of 2×12ct or 24 total input fibers. The 24 fibers are re-configured within a housing H of module M, such that three output MPO connections having an 8-count ("8ct") fiber basis are output via output MPO connections or ports $M_O$. In this scenario, the 24 fibers (i.e., 2×12ct) from the two input ports $M_I$ are converted into 3×8ct MPO connections at the output ports $M_O$. Conversion modules M are costly, require valuable space, and require thorough record keeping and labeling for properly mapping the network.

Furthermore, by definition, converters or conversion modules M place additional termination points within the network. Modules M create additional termination points, including two additional per channel or one additional per interconnection point (e.g., between 12ct and 8ct fibers), and challenge meeting the link loss budgets.

As FIG. 3 illustrates, an interconnection point P is disposed between the 12ct fiber (e.g., one 24ct fiber ribbon) connection $C_1$ or termination point and three 8ct fiber connections or termination points, each designated $C_2$. Connection points $C_1$ and $C_2$ are termination points, which are susceptible to signal loss. For example, at interconnection point P, the 24ct fiber $F_{24}$ is re-configured or mapped into three 8ct fibers, $F_8$. Each connection or termination point at interconnection point P increases the chance for signal loss across each network channel.

In view of these problems, a need exists for networks, devices, and/or methods having a reduced fiber count or fiber count basis thereby achieving 100% fiber utilization end-to-end. In some embodiments, a need exists for data centers, devices, and/or methods utilizing only an 8-count ("8ct") fiber basis to support 40G, 100G, or networks supporting more than 100G communications. Such networks, devices, and/or methods should advantageously be devoid of connectors and/or conversion modules, thereby minimizing the chance for signal loss within the network.

SUMMARY

Optical fiber networks, devices, and related methods are provided herein. An optical fiber network can comprise a plurality of network devices having optical fibers therethrough for transmitting and receiving data, wherein 100% of the optical fibers are utilized end-to-end across the plurality of network devices. Networks disclosed herein are devoid of connectors or connection modules between network devices. Networks disclosed herein also comprise only a single, direct connection between network devices. Networks disclosed herein utilize reduced fiber count devices, for example, having an 8-count (8ct) fiber basis. In some embodiments, only 8ct fiber basis devices are utilized within the network. Networks herein are configured to signal data at around 40 gigabits per second (G) per second, around 100G, or more than 100G.

Network devices disclosed herein can comprise 8ct devices. In some embodiments, the devices comprise a plurality of ferrules, and at least some of the ferrules are devoid of an optical fiber. Network devices can comprise cables (e.g., ribbon, jumper), connectors, MPO connectors, panels, switches, etc.

A method for providing an optical fiber network comprises providing a plurality of network devices comprising optical fibers for transmitting and receiving data and transmitting data using 100% of the optical fibers end-to-end across the plurality of network devices.

Embodiments of optical networks, devices, and related methods herein can, for example and without limitation, provide one or more of the following technical benefits: 100% end-to-end fiber utilization across some or all devices or components within a network; elimination or reduction of extraneous converters per network; improved and/or simplified network management; improved and/or simplified network construction; increased network efficiency; decreased cost of providing network and/or equipment; less waste; less consumables/raw materials required per network; minimized signal loss. These and other objects can be achieved by the subject matter disclosed herein.

BRIEF DESCRIPTION OF THE DRAWINGS

A full and enabling disclosure of the present subject matter is set forth more particularly in the remainder of the specification, including reference to the accompanying figures, relating to one or more embodiments, in which.

DETAILED DESCRIPTION

Figure 1:
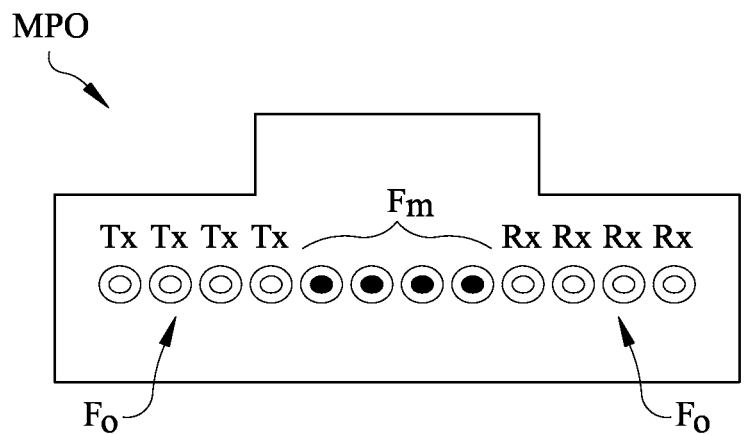
FIG. 1 is a schematic diagram of a conventional 12ct fiber basis multi-fiber push on (MPO) connector incorporating unused fibers according to some embodiments.
Figure 2:
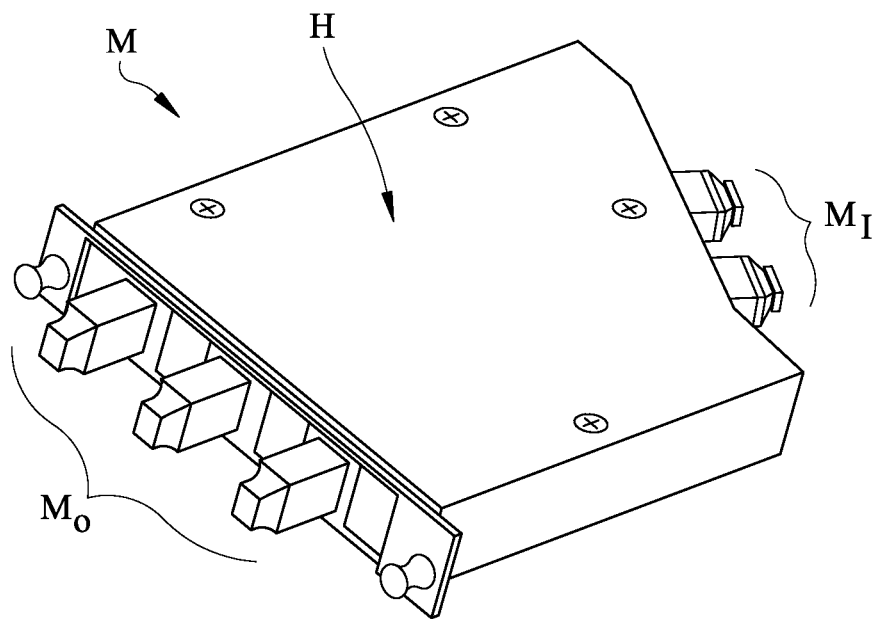
FIG. 2 is a perspective view of a conventional conversion connector module according to some embodiments.

Reduced fiber count systems (e.g., optical fiber networks and/or data centers), devices, and related methods are provided herein. Network designers can design network data centers, and/or components thereof, having a reduced fiber count or fiber count basis. This can advantageously simplify network connections, save money, eliminate costly converters, reduce materials, and/or reduce waste (e.g., an amount of unutilized fiber) within a network or system. In some embodiments, optical networks utilize structured cabling systems (SCS) having an 8ct fiber or 8ct fiber basis, which is reduced from a 12ct basis.

Devices, such as SCS (e.g., ribbon or trunk cables), connectors, transceivers, receivers, ports, communication modules, converters, servers, plates, patches, routers, switches, racks, and/or any other component within an optical fiber network or data center can utilize an 8-count ("8ct") fiber and/or an 8ct fiber basis as the building block for the associated network architecture. In some embodiments, 8ct based SCS and network components can provide efficient space usage and eliminate the requirement for expensive conversion modules. Reduced 8ct equipment can advantageously be used in combination with conventional 12ct equipment, without the need for expensive converters. In network devices facilitating communication via 8ct fiber, one or more ferrule positions can be devoid of a fiber. In some embodiments, networks herein comprise optical fiber networks configured to transmit/receive data at 10 gigabits per second (i.e., "Gbps" or "G") or more. In some embodiments, networks herein are 10G, 40G, 100G or 400G networks that are devoid of costly conversion modules, and utilize only 8ct fiber basis components or devices.

Different devices within a network can connect to one another at an interconnection point. For example, trunk or ribbon cables can be used to connect and/or communicate between two or more devices via interconnection points. In some embodiments, 8ct based SCS can minimize the number of connections at each interconnection point by one, such that each interconnection point consists of only a single, direct connection. This advantageously minimizes the chance for signal loss across each network channel.

Reference will now be made in detail to possible embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the subject matter disclosed and envisioned herein covers such modifications and variations.

As illustrated in the various figures, some sizes of structures or portions are exaggerated relative to other structures or portions for illustrative purposes and, thus, are provided to illustrate the general structures of the present subject matter. Furthermore, various embodiments of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene.

References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, if an element is referred to as being "directly connected", "directly attached", or "directly coupled" to another element, no intervening elements are present.

Furthermore, relative terms such as "on", "above", "upper", "top", "lower", or "bottom" are used herein to describe one structure's or portion's relationship to another structure or portion as illustrated in the figures. It will be understood that relative terms such as "on", "above", "upper", "top", "lower" or "bottom" are intended to encompass different orientations of the device in addition to the orientation depicted in the figures. For example, if the device in the figures is turned over, structure or portion described as "above" other structures or portions would now be oriented "below" the other structures or portions. Likewise, if devices in the figures are rotated along an axis, structure or portion described as "above", other structures or portions would now be oriented "next to" or "left of" the other structures or portions. Like numbers refer to like elements throughout.

Unless the absence of one or more elements is specifically recited, the terms "comprising", "including", and "having" as used herein should be interpreted as open-ended terms that do not preclude the presence of one or more elements.

Figure 4A:
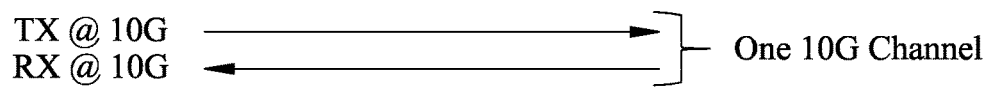
FIGS. 4A to 4C are schematic diagrams illustrating parallel optics used to facilitate data transmission at 10G, 40G, 100G, or more than 100G signals, according to some embodiments.

In some embodiments, communication networks and devices described herein utilize parallel optics for simultaneously transmitting and receiving data over multiple fibers within a network and respective data center. For example, as FIG. 4A illustrates, one 10G channel can consist of two parallel fibers for transmitting/receiving communication signals simultaneously. One fiber transmits data at 10G and another fiber receives data simultaneously at 10G. As used herein, the acronym or abbreviation "TX" denotes the transmission, transmit, and/or transmittal or transmitting of data or information. The acronym "RX" denotes the reception, to receive, and/or receiving of data or information. Thus, two parallel fibers (e.g., 1×TX and 1×RX) are necessary for one 10G channel or port in 10G/40G/100G/400G networks.

Figure 4B:
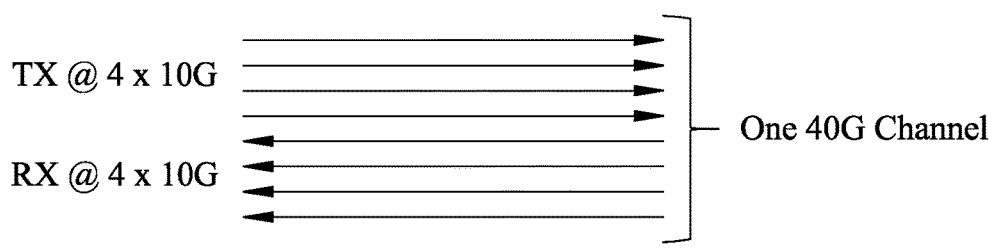

To provide faster data transfer, one 40G channel may include a total of eight fibers, for example, 4×TX and 4×RX. As FIG. 4B illustrates, one 40G channel consists only of four fibers for transmitting data (i.e., each at 10G) and four fibers for receiving data (i.e., each at 10G). Thus, only eight parallel fibers can be utilized for one 40G channel or port, where each fiber is configured to TX/RX at 10G.

Figure 4C:
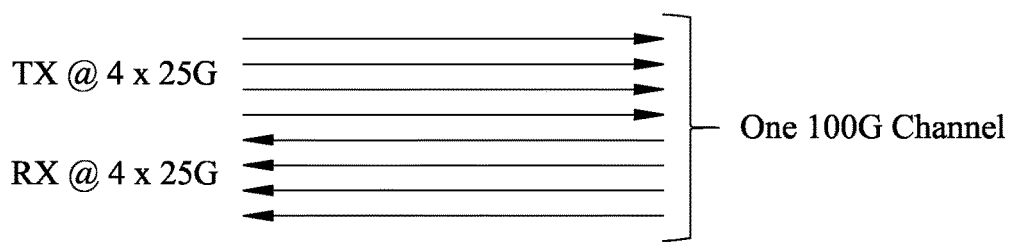

FIG. 4C illustrates one 100G channel or port utilizing parallel optics, in which the signal across each fiber is 25G as opposed to 10G. One 100G channel can also include a total of eight fibers, for example, 4×TX and 4×RX. As FIG. 4C illustrates, one 100G channel can consist of four fibers for transmitting data (i.e., each at 25G) and four fibers for receiving data (i.e., each at 25G). Thus, only eight parallel fibers can be utilized for one 100G channel or port, where each fiber is configured to TX/RX at 25G. FIGS. 4B and 4C comprise a "4 by" parallel optics in which four separate channels are utilized for transmitting (TX) and receiving (RX) data.

Notably, networks, devices, and related methods herein advantageously allow for 100% end-to-end fiber utilization within a passive network, whereby all eight fibers of an 8ct fiber basis are utilized, accounting for at least approximately 0% fiber waste. Utilizing 8ct fiber as the basic fiber structure for networks described herein is advantageous or beneficial in terms of network design, management, construction, and overall economy of the network.

Figure 5A:
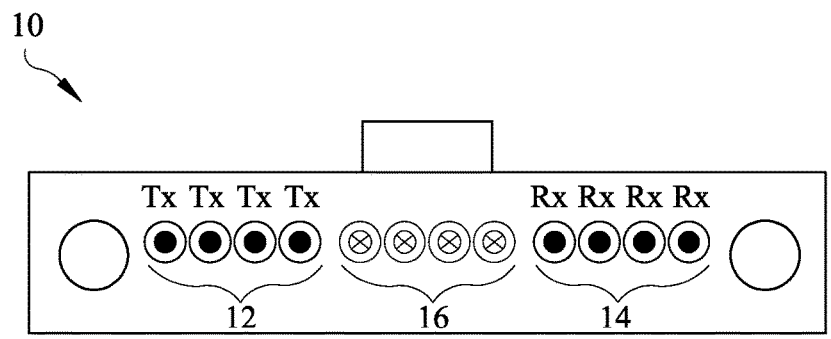
FIGS. 5A and 5B are structured cabling systems (SCS) utilizing a reduced fiber count basis according to some embodiments.
Figure 5B:
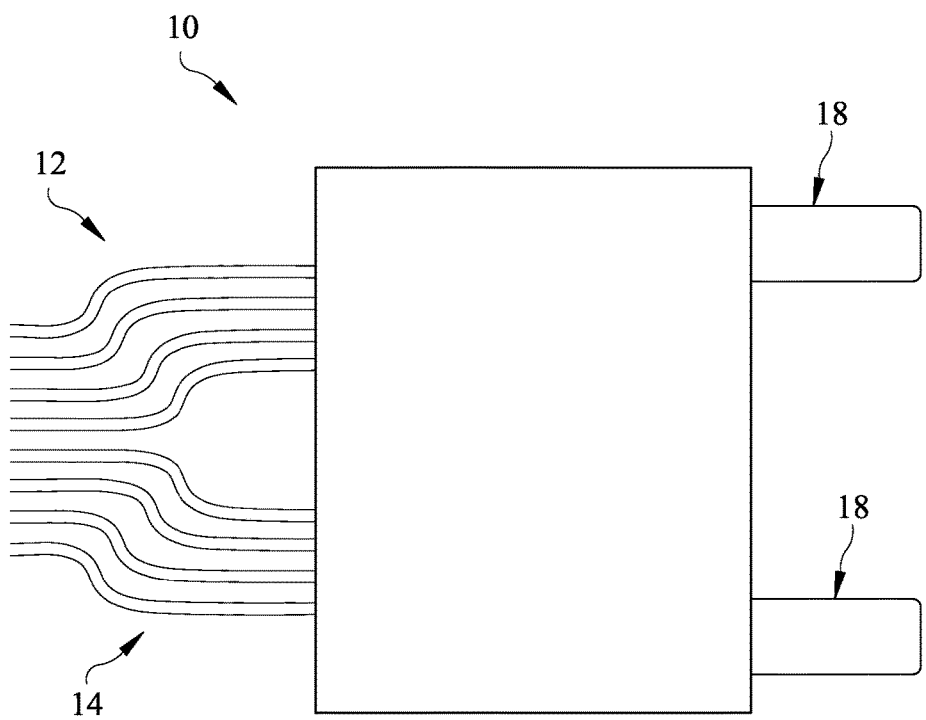

FIGS. 5A and 5B illustrate views of a SCS or cable device, generally designated 10. Device 10 is utilized in networks communicating at least at 40G, such as 100G. In other embodiments, device 10 is utilized in networks communicated at more than 100G, such as 400G. Device 10 is based upon a reduced fiber count, such as an 8ct fiber according to some embodiments.

In one embodiment, device 10 can comprise four TX fibers, generally designated 12 disposed within at least four ferrule positions of device 10, and at least four RX fibers, generally designated 14, disposed within at least four additional ferrule positions of device 10. At least four fiber ferrule positions are devoid of a fiber. For example, in some embodiments, the middle ferrule positions 16 are devoid of fiber. These can be referred to as "dummies" or dummy positions, in which no actual fibers are propagated through device 10.

As FIG. 5B illustrates and in some embodiments, only eight fibers propagate through device 10. Eight fibers can be split out or pinned to the outermost ferrule positions within device 10. For example, device 10 can comprise an 8ct SCS device, in which four transmission fibers 12 and four receiving fibers 14 propagate therein. In some embodiments, only eight fibers propagate through device 10. Device 10 can further comprise at least two terminals 18 by which device 10 can electrically communicate with other networks devices.

In some embodiments, network designers can structure network data centers for 10G/40G/100G or more utilizing only SCS devices (e.g., 10) based upon 8ct fiber. This eliminates the challenges associated with conventional network structures based upon 12ct fiber, as costly and expensive converters or conversion modules for mapping devices having different fiber bases can be eliminated. In some embodiments, 8ct devices are configured to connect and thereby utilize 100% of fibers (e.g., all 8 fibers) between components (e.g., end-to-end) within an optical fiber network (e.g., 80, FIG. 9). Networks and/or devices having reduced fiber counts further promote the efficient usage of space while decreasing signal loss.

Figure 6A:
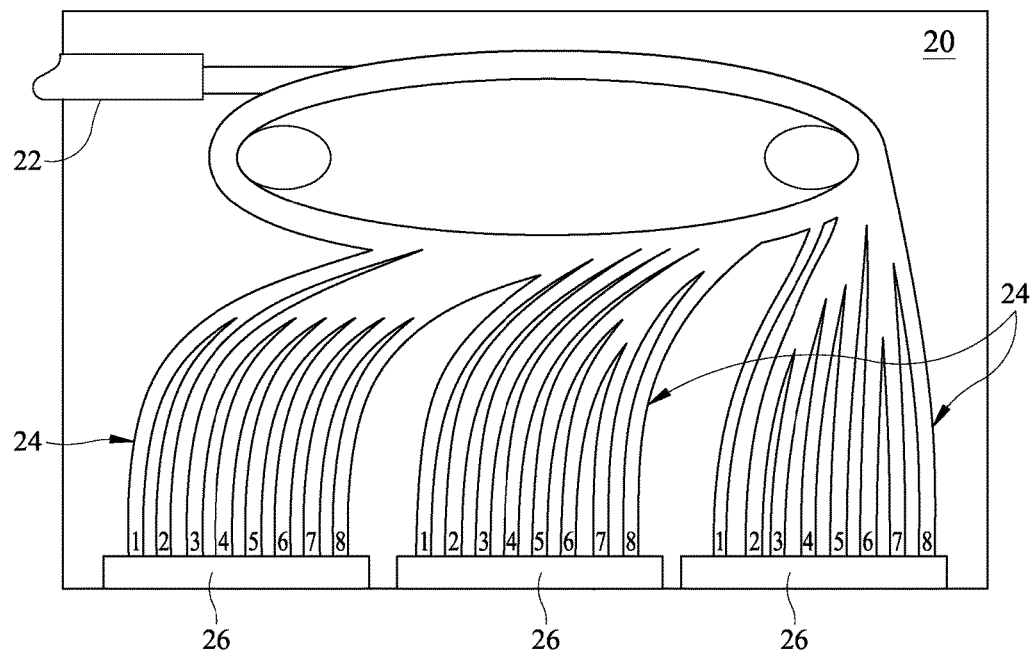
FIGS. 6A and 6B are cable termination solutions utilizing a reduced fiber count basis according to some embodiments.
Figure 6B:
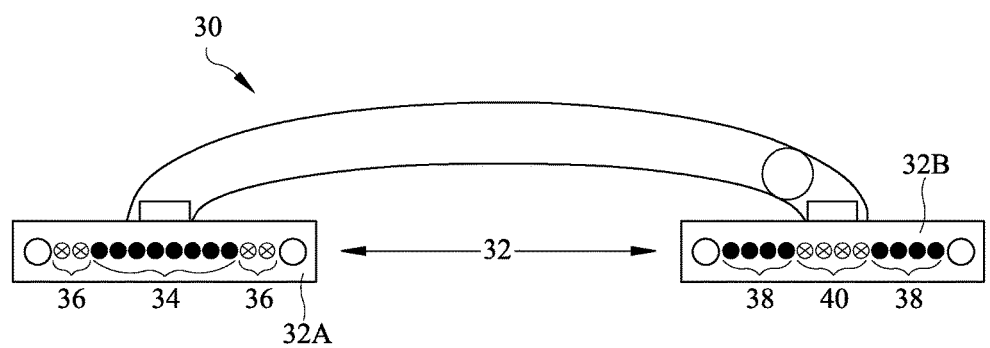

FIGS. 6A and 6B illustrate cable termination solutions utilizing a reduced fiber count basis according to some embodiments. FIG. 6A illustrates a rack unit (RU) 20. RU 20 is devoid of any conversion modules for converting between devices or components having different fiber counts or fiber bases. This can be advantageous, as the design, management, construction, and overall economy of a network or data center design can be simplified and improved. In some embodiments, RU 20 can be disposed within a network data center. RU 20 inputs a 24ct raw ended cable 22. Raw ended cable 22 can be mapped into three 8ct fiber feeds, generally designated 24. An 8ct based SCS, such as raw end cable 22 can provide improved network mapping due to an end-to-end per channel connection without conversion modules having multiple termination points. Each 8ct fiber feed mapped from raw ended cable 22 can be mapped for direct termination at an 8ct MPO adapter plate 26. Thus, RU 20 is devoid of additional conversion modules or converters required for mapping cable 22 to adapter plate 26, as each of cable 22 and adapter plate 26 can each comprise an 8ct base or 8ct fiber device.

FIG. 6B is an example of an 8ct fiber jumper device, generally designated 30, which can be disposed between a plurality of SCS having MPO connectors, generally designated 32. Device 30 can comprise an 8ct device for patching between 8ct MPO connectors 32, where desired. In some embodiments, each MPO connector 32 includes at least eight active ferrule positions and at least four ferrule positions devoid of fibers, thereby providing 100% end-to-end fiber patching or utilization via jumper device 30.

In some embodiments, a first MPO connector 32A can comprise 12 ferrule positions, where the middle eight ferrule positions 34 can be occupied by fibers and the outermost or end ferrule positions 36 can be devoid of fibers. That is, the middle eight ferrules are used, and the outermost ferrules are dummies. First MPO connector 32A is patched to second MPO connector 32B. In some embodiments, second MPO connection 32B can comprise 12 ferrule positions, where the middle four ferrule positions 40 are devoid of fibers, and the eight outermost or end ferrule positions 38 are occupied by fibers. That is, the middle four ferrules are dummies, and the outermost ferrules are used. Jumper device 30 can advantageously provide patching between connectors 32, to assist in providing 100% end-to-end fiber utilization within a network. Jumper device 30 can be configured to connect (e.g., "patch-in") one optical device (e.g., 32A) to another (e.g., 32B) for signal routing. In some embodiments, different types of devices can also be connected via device 30, as device 30 can easily be configured to allow fibers and respective communication channels to jump between devices without costly conversion modules, thereby simplifying network connections.

Figure 7A:
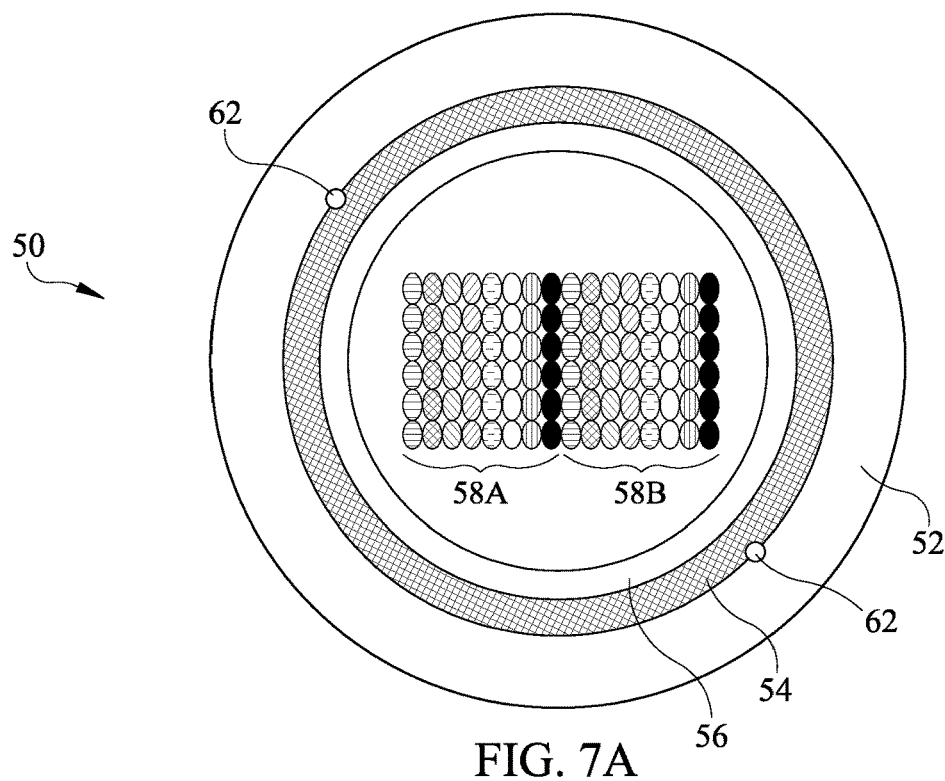
FIGS. 7A and 7B are sectional views of ribbon cables utilizing a reduced fiber count basis according to some embodiments.
Figure 7B:
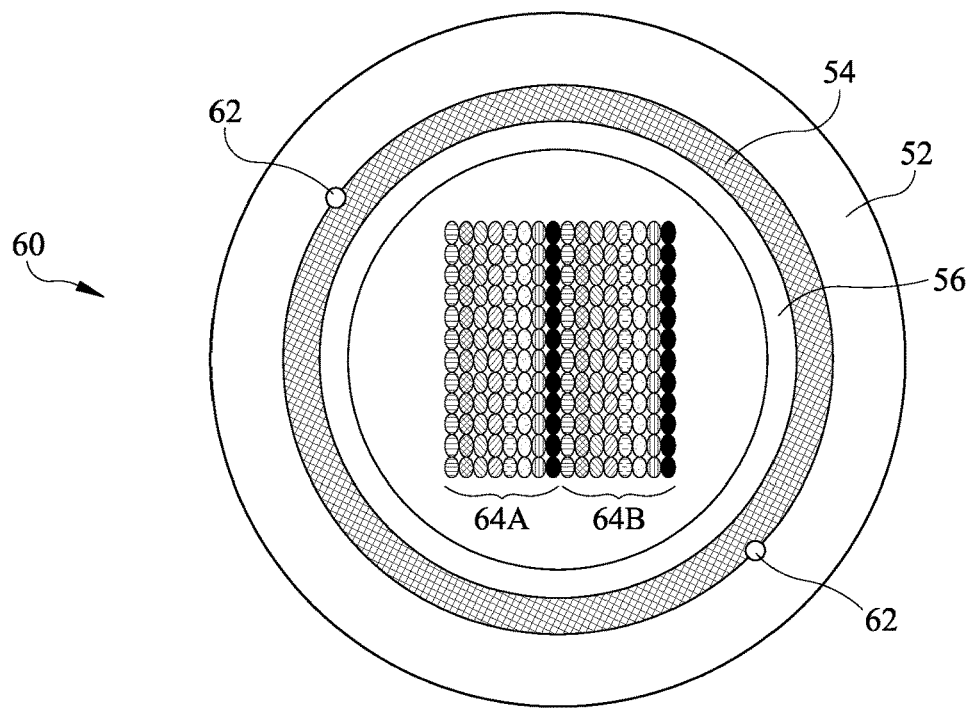

FIGS. 7A and 7B illustrate sectional views of SCS including ribbon cables or ribbon cable devices, generally designated 50 and 60, respectively, each of which utilize a reduced fiber count basis according to some embodiments. In some embodiments, each device utilizes an 8ct fiber basis. Each device can comprise an outermost layer, jacket, or covering 52. Covering 52 can include a plenum jacket comprising a plastic, in some embodiments a fire-retardant plastic. Covering 52 can comprise any suitable flexible plastic material, such as polyvinyl chloride (PVC), fluorinated ethylene polymer (FEP), polyethylene, and/or polyolefin materials.

In some embodiments, devices 50 and 60 can further comprise an intermediate layer or material 54 for providing strength or some rigidity to the cabling devices. Intermediate layer or material 54 can comprise glass, glass yarns, or any other suitable material. In some embodiments, material 54 comprises a dielectric material disposed about the inner fiber core.

Devices 50 and 60 can further comprise a centrally disposed cladding or tube 56 for physically protecting the innermost fiber core. Central tube 56 can comprise a metal and/or alloyed coating. Optical fibers can be disposed within a portion of central tube 56. In some embodiments, optical multi-mode (OM) fibers as described by ISO 11801 and/or as defined in TIA-492-AAAD are disposed within central tube 56.

Devices 50 and 60 can further comprise a ripcord 62. Ripcord 62 comprises a parallel cord or other strong yarn disposed between the covering 52 and intermediate material 54 for facilitating easier jacket removal.

Referring specifically to FIG. 7A, a 96ct fiber ribbon cable SCS device 50 is provided. FIG. 7A is a sectional view of the 96ct fiber cable. Device 50 can comprise a total of 96 fibers, which is also an 8ct fiber basis, where 100% of the fibers are used for TX/RX data. In some embodiments, all 96 fibers can be utilized 100% end-to-end within a network for improved efficiency, improved (e.g., direct) connections to other devices or network components, and decreased signal loss. Device 50 can comprise two sub-units, 58A and 58B. Each sub-unit can also comprise an 8ct fiber count (e.g., 48 total fibers) within an 8×6 fiber matrix. Device 50 includes a reduced count fiber basis of 8ct, having 100% fiber utilization within a network. Notably, costly converters and/or conversion modules are not required in connecting device 50 with other network components, which can save space within the network data center while also reducing waste.

Referring to FIG. 7B, a 192ct fiber ribbon cable SCS device 60 is provided. FIG. 7B is a sectional view of the 192ct fiber cable. Device 60 can comprise a total of 192 fibers, which is also an 8ct fiber basis, and in which 100% of the 192 fibers are utilized end-to-end within device 60 and/or between multiple devices to connect the devices within a network. In some embodiments, all 192 fibers can be utilized 100% end-to-end within a network, thereby preventing waste within the network. Device 60 can comprise two 8ct sub-units, 64A and 64B. Each sub-unit can comprise 96 total fibers within an 8×16 fiber matrix. As device 60 includes a reduced fiber count basis of 8ct, the need for expensive conversion modules and/or converters is obviated. For illustration purposes only, 96ct and 192ct fiber count ribbon cables are illustrated, however, ribbon cables and/or devices comprised of any 8ct fiber basis can be provided. For example and without limitation, networks described herein can comprise devices having: four separate channels communicating at 10G; four separate channels communicating at 25G; 16 separate channels communicating at 10G; or 16 channels communicating at 25G. Devices having any number of channels can also be provided.

Figure 8:
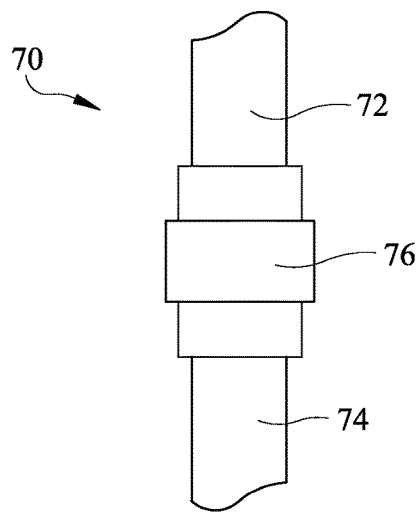
FIG. 8 is an interconnection point between two separate devices having a reduced fiber count basis according to some embodiments.

FIG. 8 illustrates an interconnection point between two separate ribbons, pieces of network equipment, or network devices within a network according to some embodiments. Each device can comprise a reduced fiber count, for example, of an 8ct fiber basis. In some embodiments, each device (e.g., communication modules, cables, ribbons, connectors, switches, plates, etc.) to be connected within a network can have a same fiber basis, such that no converters or conversion modules are necessary.

Figure 3:
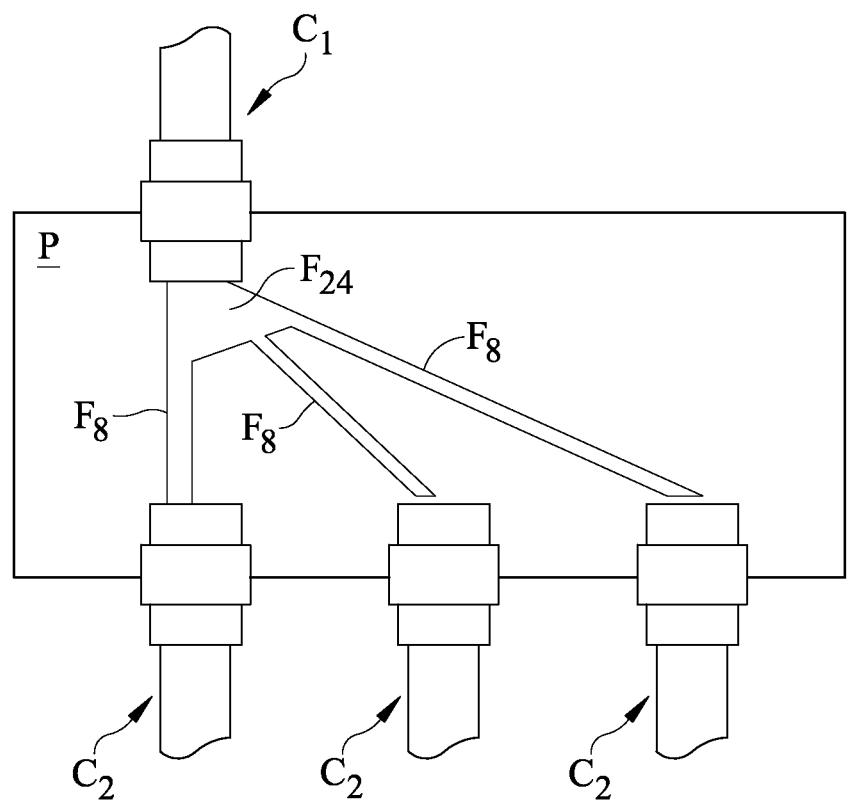
FIG. 3 is a conventional interconnection point between a fiber having a 12ct fiber basis and three fibers of an 8ct fiber basis, according to some embodiments.

For example and as noted in the background section above, (e.g., see also FIG. 3), one problem associated with conventional networks is that interconnection points between devices include a plurality of terminations and/or connections at the interconnection point. This contributes to signal loss within the network. In contrast, FIG. 8 illustrates an interconnection point 70 disposed between a first network device 72 and a second network device 74. Each network device can comprise a reduced fiber count, for example, having an 8ct fiber basis. As each device 72 and 74 in the network has an 8ct fiber, the need for converters becomes obviated. Notably, as illustrated in FIG. 8, one connection 76 is provided per interconnection point 70, which minimizes the chance for signal loss across each network channel.

Figure 9:
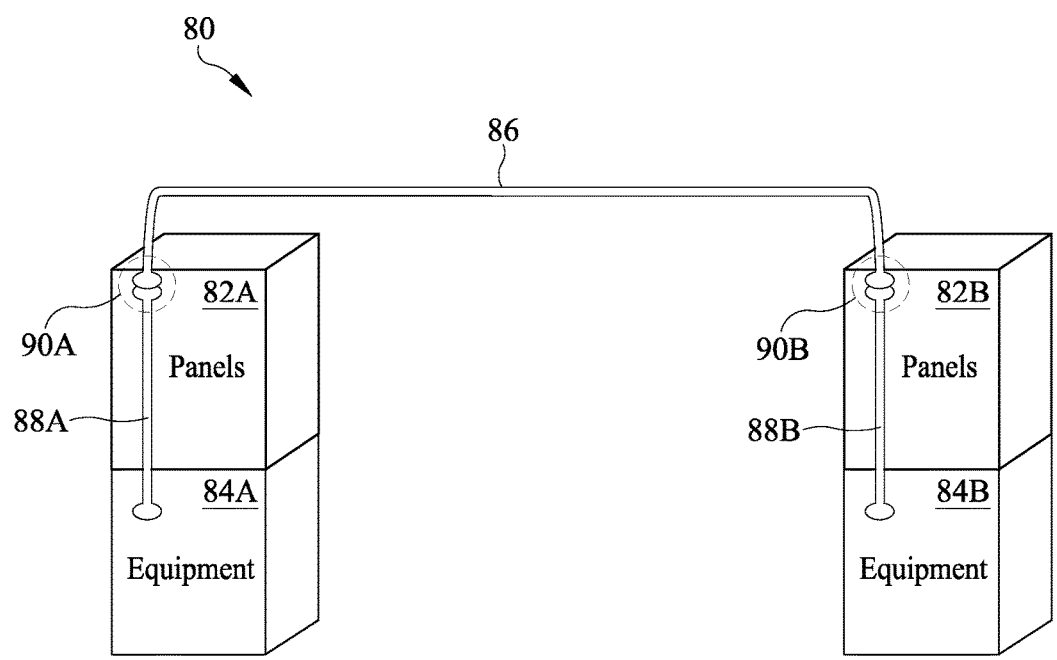
FIG. 9 is a schematic network diagram of a network utilizing a reduced fiber count basis according to some embodiments.

FIG. 9 is a schematic network diagram of an optical fiber network, generally designated 80, utilizing an SCS having a reduced fiber count basis according to some embodiments. Notably, network 80 comprises an optical fiber network comprised of a plurality of network devices (e.g., network equipment 84A, 84B) comprising optical fibers, wherein 100% of the optical fibers are utilized end-to-end across the plurality of network devices. In some embodiments, network 80 can comprise an end-to-end passive network comprising several interconnection panels, generally designated 82A and 82B for connecting various components and/or portions of network equipment 84A and 84B within a network data center. In some embodiments, at least one trunk cable 86 can be used to connect two or more network panels 82A and 82B. For illustration purposes, only two panels are illustrated, however, multiple panels and/or pieces of various types of network equipment can be provided in network 80. Network 80 can comprise a parallel optics network for communicating at 10G, 40G, 100G, or more than 100G (e.g., 400G). Notably, network 80 is devoid of a plurality of 12ct raw end cable terminations and/or conversion modules.

As FIG. 9 illustrates, trunk cable 86 can terminate at interconnection points 90A and 90B disposed between respective network panels 82A and 82B. Notably, interconnection points 90A and 90B comprise a single direct connection. At interconnection points 90A and 90B, opposing ends of trunk cable 86 can directly connect with multiple different patch cords or cables 88A and 88B, respectively. Each of trunk cable 86 and cables 88A and 88B can comprise a reduced fiber count, in some embodiments, having an 8ct fiber basis. In some aspects, each cable 86, 88A, and 88B can also comprise a same count fiber basis, such that each fiber within the cables is utilized end-to-end within network or a portion thereof.

Provision of one direct connection at interconnection points 90A and 90B not only improves signal strength within a network, but also prevents waste and saves space. Notably, network 80 can comprise components and devices having 100% fiber utilization end-to-end. In some embodiments, network 80 only has components and devices having 100% fiber utilization end-to-end. As FIG. 9 illustrates, trunk cable 86 and cables 88A and 88B are connected and can comprise 100% fiber utilization therebetween. In some embodiments, only panels, cables, and equipment with an 8ct fiber or fiber basis are used within network 80. In some aspects, trunk cable 86 and/or jumper cables 88A and 88B comprise 8ct ribbon terminated by MPO connectors. No costly conversion modules are required in network 80 for connecting trunk cable 96 to cables 88A and 88B.

Figure 10:
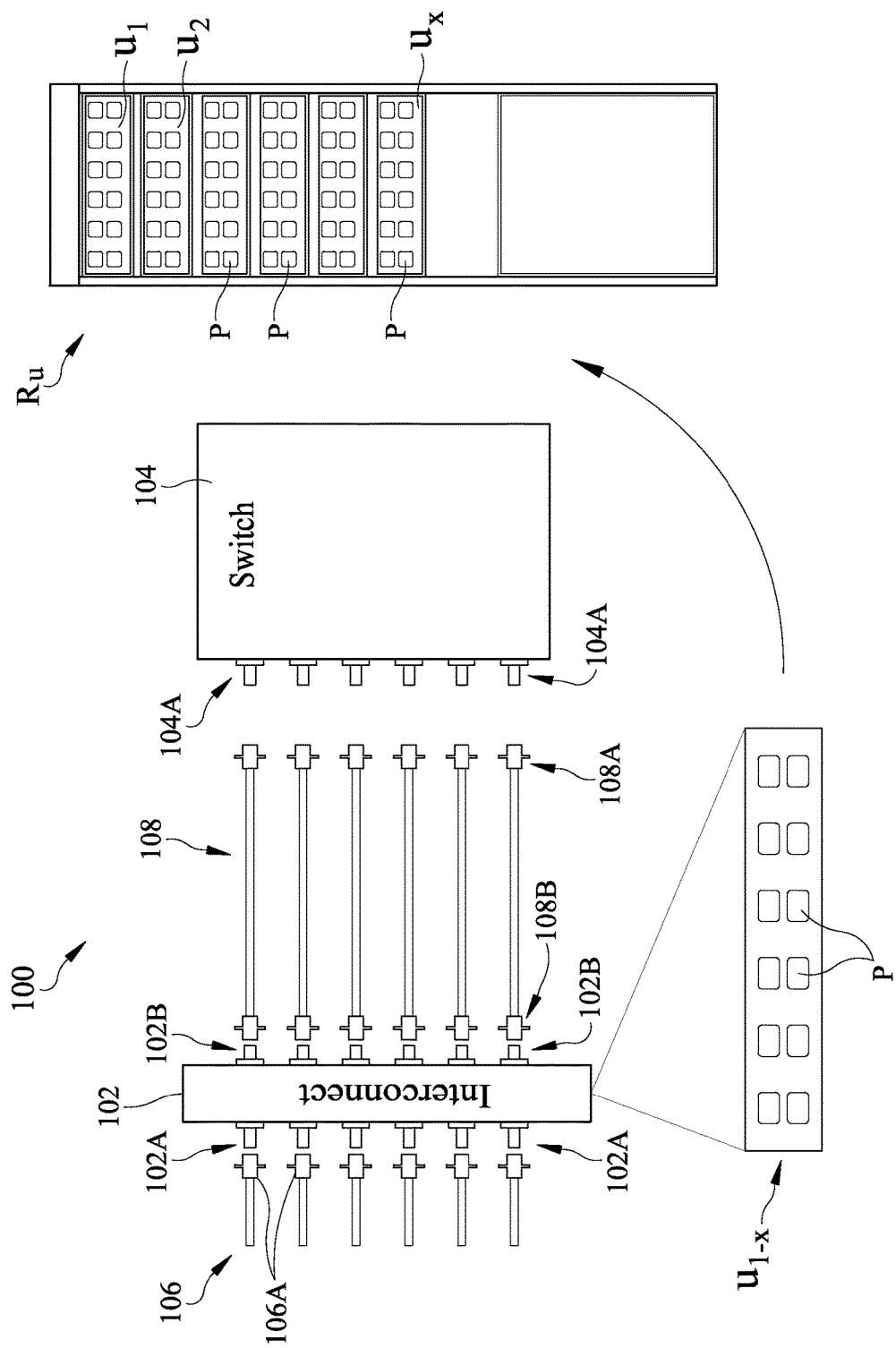
FIG. 10 is a network data center, and/or components thereof, having a reduced fiber count basis according to some embodiments.

FIG. 10 illustrates a network data center, generally designated 100, having a reduced fiber count basis according to some embodiments. Data center 100 can comprise one or more interconnect panels 102 for connecting multiple network devices, entities, components, and/or equipment. Panel 102 can comprise a plurality of inputs 102A and a plurality of outputs, 102B by which ribbons, communication modules, devices, and/or any other network components can directly connect. Data center 100 can further comprise one or more switches 104. Switches 104 can comprise and end with connectors or connections 104A, which in some embodiments terminate at MPO connectors. Notably, data center 100 is devoid of conversion modules between panel 102 and switch 104, as each network component or device utilizes an 8ct fiber basis and has 100% utilization end-to-end therebetween.

A plurality of 8ct fiber ribbons or cables (e.g., FIGS. 7A/7B), generally designated 106A can be received as input at panel 102. A connecting end 106A of each ribbon 106 can connect directly with inputs 102A of panel 102. In some aspects, connecting ends 106A and inputs 102A can comprise MPO connectors.

A plurality of 8ct fiber ribbon jumpers or jumper cables, generally designated 108 can be connected at panel outputs 102B. Jumper cables 108 can each comprise first and second connecting ends 108A and 108B, one of which connects panel to 102 and the other to switch 104. In some aspects, a connecting end 106A of each ribbon 106 can connect directly with inputs 102A of panel 102. In some aspects, connecting ends 106A and inputs 102A can comprise MPO connectors.

Each interconnect panel 102 can comprise a rack unit $U_{1-X}$. A plurality of rack units $U_1$ to $U_X$ can be provided in a single rack $R_U$ of data center 100. Each unit $U_1$ to $U_X$ can comprise a plurality of ports P for facilitation communication of data within a network and/or across network equipment.

Embodiments as disclosed herein may for example provide one or more of the following beneficial technical effects: 100% end-to-end fiber utilization across some or all devices or components within a network; elimination or reduction of extraneous converters per network; improved and/or simplified network management; improved and/or simplified network construction; increased network efficiency; decreased cost of providing network and/or equipment; less waste; less consumables/raw materials required per network; and/or minimized signal loss.

While the devices, networks, and methods have been described herein with reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure.

Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for providing an optical fiber network, the method comprising:
   providing a plurality of network devices comprising optical fibers for transmitting and receiving data;
   providing a plurality of network cables comprising optical fibers and connecting at least some of the network devices; and
   transmitting data using 100% of the optical fibers end-to-end across the plurality of network devices,
   wherein each of the plurality of network devices and cables have an 8 ct fiber basis,
   wherein the network is devoid of a converter or conversion module on each interconnect point between connected devices of the plurality of network devices, and
   wherein the network comprises a "4 by" parallel optics having four separate channels for transmitting (TX) and receiving (RX) data, and
   wherein transmitting data comprises transmitting data via sixteen separate channels.

2. The method according to claim 1, wherein transmitting data comprises transmitting data at 40 gigabits per second (G) or more.

3. The method according to claim 1, wherein transmitting data comprises transmitting data at 100 gigabits per second (G) or more.

* * * * *